Nov. 2, 1965  L. A. SCHOTT  3,215,367
DIRIGIBLE FLYING APPARATUS
Filed July 29, 1963
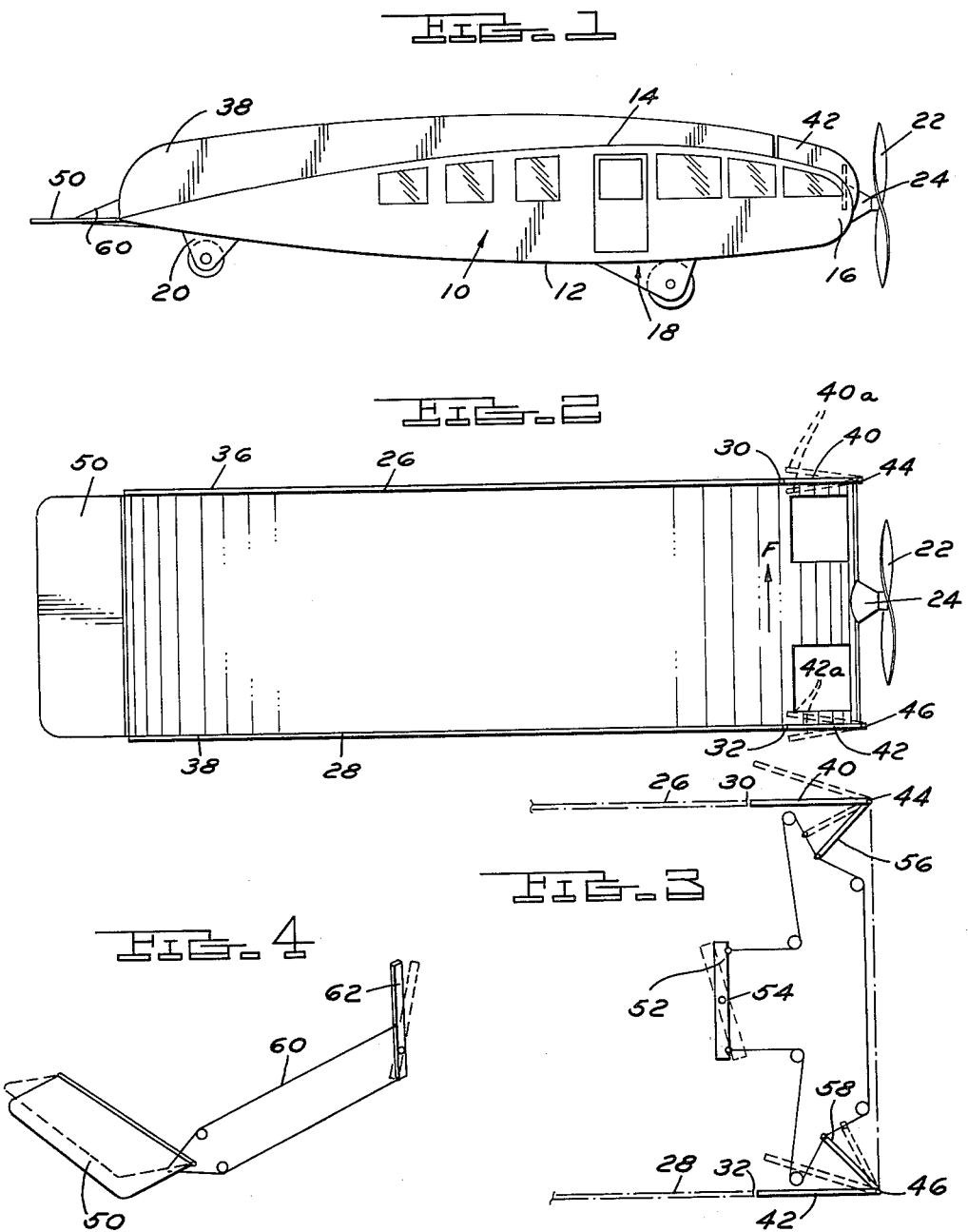
INVENTOR.
LAWRENCE A. SCHOTT
BY
Barnes, Kisselle, Raisch & Choate
ATTORNEYS

United States Patent Office 3,215,367
Patented Nov. 2, 1965

3,215,367
DIRIGIBLE FLYING APPARATUS
Lawrence A. Schott, 1757 Puritan, Detroit, Mich.
Filed July 29, 1963, Ser. No. 298,257
3 Claims. (Cl. 244—13)

This invention relates to a dirigible flying apparatus and more particularly to a design and construction for a heavier-than-air craft which has certain safety features and aspects which make it safer, not only for commercial use but for use by private owners.

It is an object of the invention to provide an aircraft which has controls more efficiently designed for flight placed in such a way that they contribute to the stability of the plane rather than detract from it, especially in turning.

Another feature of the device is a shape which makes it particularly useful for carrying passengers or cargo without a wing span which adds weight and drag and which cannot be used for payload.

Another feature of the invention is the flight characteristic which permits it to remain under control without forward speed so it may be landed without power, if necessary, and has no tendency to spin.

Another feature of the device is the adaptability to amphibious planes. This is due to the shape and to the lack of a tendency to windvane on a vertical axis either on land or water.

Other objects and features of the invention relating to details of construction and operation will be apparent in the following description and claims.

Drawings accompany the disclosure and the various views thereof may be briefly described as follows:

FIGURE 1, a side elevation of the aircraft.
FIGURE 2, a top elevation of the aircraft.
FIGURE 3, a diagrammatic view of a rudder control.
FIGURE 4, a diagrammatic view of an elevator control.

Referring to the drawings:

The main body of the aircraft shown at 10 viewed from the side has a bottom surface and top surface defined by lines 12 and 14 with a nose portion 16 forming an air foil section following more or less the contours of the massive wing sections now used on huge planes. The fuselage design is an airlift section in itself so that it needs no wings in order to create the air lift. Suitable landing gear 18 is shown which can be retractable or not as desired. A tail wheel 20 is also provided but a nose wheel could be substituted if desired. On the nose portion 16 is a propeller 22 driven by a suitable power unit 24, but it will be appreciated that any conventional power source can be used. The craft is designed so that loading will result in a center of gravity below the longitudinal axis of the body section.

Along the top of each side edge of ahe airplane are long continuous vanes 26 and 28 extending to points 30 and 32 at the forward portion of the plane. The vane extends along the top of the foil section curving down at the rear portions 36 and 38 to trailing portion of the top air foil surface. The direction of the airplane in flight is controlled by a pair of rudder portions 40 and 42 which are forward continuations of the vane portions 26 and 28 respectively. It is important that these rudders are positioned above the center line of the craft and they are shown pivoted at the forward ends thereof at 44 and 46 respectively, FIGURES 2 and 3, so they may move to the dotted line positions shown. An elevator flap is required either at the front or rear of the craft. In the embodiment shown, an elevator flap 50 is positioned at the rear of the foil section.

As shown in FIGURE 3, the rudder portions 40 and 42 are moved by a contral lever 52 pivoted at 54 having cables connected to control arms 56 and 58 respectively associated with rudders 40 and 42. As shown in FIGURE 4, the elevator 50 can be shifted by a cable 60 and a control lever 62. Suitable hydraulic, pneumatic, or electric controls can be introduced in a manner which is common in present day aircraft. The elevator is movable to various obtuse angles relative to the top and bottom surfaces of the trailing edge of the air foil body.

It is important in understanding the features of the present invention to recognize that when an aircraft goes into a turn, it also banks into the turn, the outside of the aircraft relative to the center of the turn going up and forward and the inside of the aircraft going down. With the normal type of rudder control presently used on the upper tail portion of an aircraft, when the rudder is turned to the left, the airplane will turn to the left and should bank to the left. It will be appreciated, however, that forces against the rudder at the upper tail portion in a left turn will set up a torque which tends to bank the airplane to the right so that the rudder force is actually fighting the banking requirement for the particular turn. In a conventional airplane, ailerons are needed to counteract this adverse torquing effect. But ailerons used to bring a wing up also increase the drag on that wing which should be moving faster of the two wings in a turn.

With the present invention, the control devices are so arranged that the rudder settings for a particular turn will tend to bank the craft at the proper direction and thus the control elements are not fighting each other as the craft goes into a turn.

To explain this in more detail, in FIGURE 2, the two rudders 40 and 42 are shown to have dotted line positions to the right and left. Assuming, for example, that the rudders are turned to the right to the position shown as 40a and 42a, the aircraft will now be turned to the left by reason of the direct force of these rudders centripetally to the turn. The front end is thus forced around in the proper direction. At the same time, it will be noticed that the torque forces F on the rudders applied to the craft directly and above the center line will tend to bank the airplane to the left.

This banking tendency is also increased by another aerodynamic factor. It will be noticed that the rudder 42 is moved to the position 42a so that it is out of line with the fin 28. Thus, air that is being raised over the air foil between the rudders and fins is released or spilled out at the point 32, thus decreasing the pressure at the right-hand side of the leading edge of the air foil vehicle and causing this side to move forward and rise aerodynamically, thus contributing to the banking and turning force. On the other side when vane 40 is moved to the position 40a, air pressure is increased on the leading edge of the air foil along the inside of the rudder 40 and also along the inside of vane 26 by reason of entry at the point 30 and this tends to force the left-hand side of the vehicle down and increases forward resistance thus contributing to the proper banking force on the craft. Thus, all forces on the craft are in harmony as the craft is directed into a particular turn in either direction. The vehicle can be moved up or down by changing of the position of the elevator 50.

An ordinary airplane has a dangerous tendency to spin whereas the herein disclosed design of aircraft cannot be made to spin under any conditions. With a loss of forward speed, a conventional plane is impossible to control whereas the disclosed design will settle to the ground in upright position. It will be understood that even in a flat fall the craft may be turned on a vertical axis because air slipping around the leading edge is controlled by the forward rudders. By nosing down, a forward glide speed can be obtained and a landing effected.

Another advantage of the device is the absence of any vertical or transverse windvaning action either on land or water or in the air. One of the big problems in handling aircraft on water has been the fact that as soon as the craft lands on the water, any wind acting upon it will tend to move it like a weather vane into a certain position relative to the wind. Accordingly, it is difficult to direct the plane to a particular destination when taxiing to a particular landing. The same effect is noticed on airplanes which after landing on a runway must alter course and move into a cross wind to get to a particular spot. With the presently disclosed aircraft, this windvaning is completely absent because the craft presents a solid balanced surface to any wind forces. This resistance to windvaning is also present when the craft is fully airborne since it has no tendency to windvane on its vertical axis but rather rights itself by windvaning into the wind on its longitudinal axis. For example, assuming that the craft is in free fall starting at an angle to horizontal about its longitudinal axis, its bottom will present itself flat and upright relative to the earth. The pilot then may orient its direction as desired. This is attributable to the fact that the main weight of the craft—engine, landing gear, seats, passengers and cargo—is positioned mainly below the center line of the aircraft and also to the vaning effect of the side walls and stationary vanes 26, 28.

Thus, in a stall where there is a loss of power, the device can still be controlled and maintained in an upright position and pancaked into a landing which, though abrupt, may not be destructive of the entire craft and fatal to passengers. The device is maneuverable even without power and can glide and remain upright and will not spin because of its particular construction. The main body portion, of course, is constructed in an airlift section and, accordingly, no wings are required to provide the necessary lift. It can be as wide laterally as it is long and still be a stable craft.

While it has normally assumed that a dihedral effect is necessary with respect to symmetrically angled wings of an airplane, the present craft has been found to be stable without any dihedral effect required other than that inherent in the structure itself.

I claim:

1. A heavier-than-air craft having a body portion formed as an air foil for housing passengers, fuel and cargo sections, stationary sides vanes spaced on the upper surface of said body portion extending to a point adjacent the leading edge of said body portion, and controllable rudder portions forming, in a neutral position, a continuation of said vane portions toward the leading edge of said body portion, said rudder portions being movable on an axis forward of said stationary portions to positions wherein the trailing ends of said rudder portions are inwardly or outwardly of the stationary vane portions depending on the direction of movement.

2. An aircraft comprising:
   (a) a main body portion in the shape of an air foil to provide the main lift and also a passenger, fuel and cargo compartment,
   (b) power means on said body portion to impart a forward motion to said main body portion,
   (c) means at one end of said body portion for controlling the horizontal attitude of the plane,
   (d) a pair of continuous side vane portions extending in spaced relation along the upper surface of said air foil terminating adjacent but spaced from the forward end of the air foil, and
   (e) means to form a control rudder positioned on the upper forward portion of said main body portion, the means to form a control rudder comprising control vanes positionable forward of and in line with said side vanes on each side of said aircraft, said control vanes being movable on a vertical axis to positions wherein the trailing ends of said control vanes are spaced respectively outward or inward of said side vanes.

3. An aircraft comprising:
   (a) a main body portion in the shape of an air foil to provide the main lift and also a passenger, fuel and cargo compartment,
   (b) power means on said body portion to impart a forward motion to said main body portion,
   (c) means at one end of said body portion for controlling the horizontal attitude of the plane,
   (d) a pair of continuous side vane portions extending in spaced relation along the upper surface of said air foil terminating adjacent but spaced from the forward end of the air foil, and
   (e) means to form a control rudder positioned on the upper forward portion of said main body portion, said side vanes being permanently disposed at an angle substantially normal to the top surface of the main body portion.

References Cited by the Examiner

UNITED STATES PATENTS

| | | | |
|---|---|---|---|
| 1,011,604 | 12/11 | French | 244—13 |
| 1,405,667 | 2/22 | Carlson | 244—87 |
| 1,749,272 | 3/30 | Bird | 244—36 |
| 1,890,012 | 12/32 | Alfaro | 244—42.6 |
| 3,029,042 | 4/62 | Martin | 244—36 |

FERGUS S. MIDDLETON, *Primary Examiner.*

R. DAVID BLAKESLEE, *Examiner.*